Figure 1:
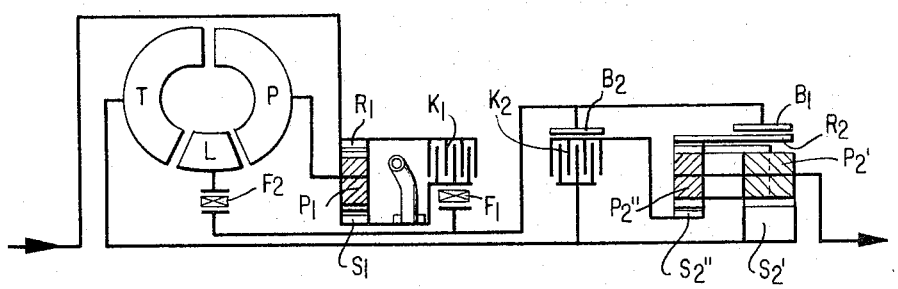

Oct. 11, 1966     HANS-JOACHIM M. FÖRSTER ETAL    3,277,746
CHANGE-SPEED TRANSMISSION
Filed Jan. 22, 1964

INVENTORS.
HANS-JOACHIM M. FÖRSTER
OTTO RÖDER

BY   Dicke & Craig
ATTORNEYS.

United States Patent Office 3,277,746
Patented Oct. 11, 1966

3,277,746
CHANGE-SPEED TRANSMISSION
Hans-Joachim M. Förster, Stuttgart-Riedenberg, and Otto Röder, Fellbach, Germany, assignors to Daimler-Benz Aktiengesellschaft, Stuttgart-Unterturkheim, Germany
Filed Jan. 22, 1964, Ser. No. 339,439
Claims priority, application Germany, Jan. 29, 1963, D 40,775
10 Claims. (Cl. 74—730)

The present invention relates to change-speed transmission, especially for motor vehicles, having a hydrodynamic torque converter and a planetary gear set especially a shiftable planetary gear set, operatively connected in the input to the torque converter, that is, ahead of the torque converter in the direction of normal flow of torque and disposed on the driven side of the torque converter, which planetary gear set is operatively connected with the engine by a bell-shaped drive housing extending over and surrounding the torque converter.

With change-speed transmissions of the type mentioned hereinabove, friction and eddy losses occur in those spaces, the walls of which move relative to one another and which additionally are either completely or partially filled with oil. With the aforementioned transmissions, this is particularly the case for the spaces between the outer shells or housings of the pump and/or turbine wheels, and the bell-shaped drive housing as well as for that housing in which is arranged the input-connected planetary gear set operatively connected ahead of the torque converter.

The aim of the present invention is to avoid with change-speed transmissions of the type described hereinabove, such friction and eddy losses. The underlying problems are solved in accordance with the present invention in that the outer shell or housing of the pump wheel forms a liquid-tight converter housing surrounding the turbine wheel and the planetary gear set it arranged in a separate part of the bell-shaped drive housing which is sealed both with respect to the inside of the torque converter housing, as well as also with respect to the inside of the remainder of the bell-shaped drive housing.

It is known in the prior art to construct the outer shell or housing of the pump wheel as a liquid-tight torque converter housing. However, use is made of this possibility only with such torque converters in which a bell-shaped drive housing surrounding the entire torque converter is absent, that is, with such torque converters in which the pump wheel is directly connected with the driving engine or in which the input-connected planetary gear set, i.e. the planetary gear set operatively connected ahead of the torque converter in the normal direction of transmission of torque, is disposed on the driving or input side of the torque converter.

The present invention offers the advantage that the space between the torque converter and the bell-shaped driving housing can be kept free of oil. Since with an operating input-connected planetary gear set, that is, with a non-blocked planetary gear set producing a speed reduction and operatively connected in the input to the torque converter, the bell-shaped driving housing, on the one hand, and the pump and turbine wheels, on the other, rotate at different rotational speeds, particularly high friction losses are avoided thereby in the narrow spaces between the large-surfaced bell-shaped driving housing and the outer shells or housings of the torque converter wheels.

Since furthermore, the planetary gear set requires in the unlocked condition thereof a lubrication, yet particularly in this operating condition relative movements occur between the members of the planetary gear set and the walls of the part of the bell-shaped drive housing located on the output side, means are arranged in accordance with the present invention within the separate part of the bell-shaped drive housing accommodating the planetary gear set, for example, in the form of at least one scoop pipe, for the discharge out of this housing part of the oil quantities continuously supplied for the lubrication of the planetary gear set.

Since these friction and eddy losses occur within the housing of the planetary gear set not only in the non-locked condition of the latter, it is particularly advantageous when the means provided for the discharge, for example, the scooping pipe, are automatically shifted, when shifting the planetary gear set from the unblocked into the blocked condition thereof, from an effective to an ineffective position.

Accordingly, it is an object of the present invention to provide a change-speed transmission of the type mentioned hereinabove which eliminates the aforementioned drawbacks and shortcomings encountered with the prior art constructions.

It is another object of the present invention to provide a change-speed transmission provided with a torque converter and a planetary gear set connected in the input of the torque converter and located on the output side thereof which eliminates by simple and inexpensive means friction and eddy as well as vortexing losses due to relative movements of the parts.

Another object of the present invention resides in the provision of a torque converter having an input-connected planetary gear in which those wall parts and transmission elements that are either partly or completely filled with oil and move relative to one another are so constructed and arranged as to minimize losses due to friction and vortexing of the hydraulic medium present between the movable walls and/or transmission parts.

Still another object of the present invention resides in the provision of a change-speed transmission provided with a torque converter in which the space between the torque converter and bell-shaped driving housing can be kept free of oil.

Still a further object of the present invention resides in the provision of a change-speed transmission of the type described hereinabove in which high friction losses within the narrow spaces between the bell-shaped driving housing and the outer shells or housings of the torque converter wheels which have large surfaces are effectively eliminated by simple means.

A still further object of the present invention resides in the provision of a change-speed transmission of the type described hereinabove in which means are provided for discharging the lubricating oil out of the space accommodating the planetary gear set to avoid friction losses and eddying losses as a result of the relative movements.

Another object of the present invention resides in the provision of a change-speed transmission of the type described hereinabove in which the means for discharging the lubricating oil out of the space accommodating the input-connected planetary gear set are automatically controlled by the selective locking and unlocking of the planetary gear.

Figure 2:
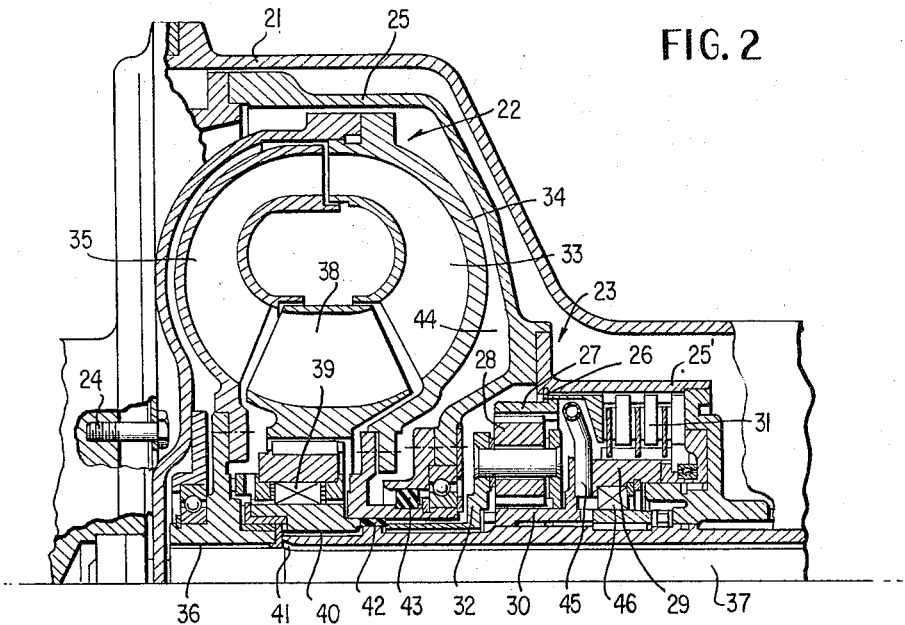

These and further objects, features and advantages of the present invention will become more obvious from the following description when taken in connection with the accompanying drawing which shows, for purposes of illustration only, one embodiment in accordance with the present invention, and wherein:

FIGURE 1 is a schematic view of a change-speed transmission in accordance with the present invention indicating the principle of construction thereof, and FIGURE 2 is a partial axial cross-sectional view, on an enlarged scale, through the hydrodynamic torque converter and the input-connected planetary gear set of the change-speed transmission of FIGURE 1.

Referring now to the drawing and more particularly to FIGURE 1, this figure illustrates a change-speed transmission which is driven by the engine (not shown) of a motor vehicle. More particularly, in FIGURE 1, the engine (not shown) of a motor vehicle drives by way of the ring gear $R_1$ of a planetary gear set $R_1$, $P_1$, $S_1$ the pump wheel $P_1$ of a hydrodynamic torque converter $P$, $T$, $L$ which is operatively connected with the planet carrier of the planetary gear set $R_1$, $P_1$, $S_1$. The planetary gear set $R_1$, $P_1$, $S_1$, constructed as speed reduction gear, is adapted to be locked by the friction clutch $K_1$, whereby one of the friction disk carriers of this clutch $K_1$ simultaneously forms the outer ring of a one-way brake $F_1$, the inner ring of which is operatively connected with the stationary transmission housing. The guide wheel $L$ of the torque converter $P$, $T$, $L$ is also supported on a one-way brake $F_2$ disposed with the inner ring thereof at the stationary transmission housing.

The turbine wheel $T$ drives the sun gear $S_2'$ of an out put-connected change-speed transmission, i.e. a change speed transmission connected to the rear of the torque converter as viewed in the normal direction of transmission of torque, and consisting of the sun gears $S_2'$ and $S_2''$, of the mutually meshing or mating planet gears $P_2'$ and $P_2''$ and of the ring gear $R_2$, whereby the ring gear $R_2$ is adapted to be braked at the transmission housing with the aid of the band brake $B_1$. In the illustrated embodiment of the dual planetary change-speed gear, the planet gear $P_2''$ meshes with the sun gear $S_2''$ and with a ring gear $R_2$. Additionally, the planet gear $P_2''$ is in operative engagement with the other planet gear $P_2'$. The latter, in its turn, is in meshing engagement with the sun gear $S_2'$, but not with the ring gear $R_2$. Since the operation of such a change-speed transmission is well known in the art, a detailed description is dispensed with herein, particularly as the present invention is not limited to the details of this change-speed gear. The sun gears $S_2'$ and $S_2''$ are adapted to be connected with one another by the friction disk clutch $K_2$. The outer friction disk carrier of this clutch $K_2$ and therewith the sun gear $S_2''$ are additionally adapted to be braked at the stationary transmission housing by means of the band brake $B_2$. The common planet carrier for the planet gears $P_2'$ and $P_2''$ serves as transmission output.

According to FIGURE 2, the stationary transmission housing 21 surrounds the torque converter generally designated by reference numeral 22 and consisting of pump, turbine and guide wheels $P$, $T$ and $L$, respectively, and a planet gear set generally designated by reference numeral 23. The driving member is flangedly connected by means of the bolt 24 with the bell-shaped drive housing 25 which in turn is operatively connected by way of splines 26 provided on the multi-partite bell-shaped drive housing 25 with the ring gear 27 of the planetary gear set 23 and thus with the planet gears 28 of the planetary gear set 23. A sleeve 29 constructed in a step-shaped manner carries or constitutes itself, on the one hand, the sun gear 30 of the planetary gear set 23 and, on the other, carries or forms itself the inner friction disk or lamellae carrier of an engageable friction disk clutch 31, the outer friction disk or lamellae carrier of which is carried by or formed by the part 25' of the bell-shaped drive housing 25 so that the planetary gear set 23 is locked upon engagement of the clutch 31. The planet carrier 32 is operatively connected with the pump wheel 33 of the hydrodynamic torque converter 22 for rotation in unison therewith, whereby the outer shell or housing 34 of this pump wheel forms the liquid-tight torque converter housing, properly speaking. The turbine wheel 35 drives by way of the splined connection 36, the hollow shaft 37 which forms the output for this transmission section. The guide wheel 38 is supported on the stationary housing part 41 by way of the one-way brake 39 and the splined connection 40.

The planetary gear set 23 is disposed outside of the torque converter housing 34, properly speaking, and within a separate part 25' of the bell-shaped drive housing 25, whereby this housing part 25' is sealed by the seal 42 against the interior space of the torque converter housing 34 and by the seal 43 against the space 44 between the torque converter housing 34 and the bell-shaped drive housing 25. The space 44 can be kept free of oil by this arrangement of the planetary gear set 23 and the described construction of both the torque converter as well as also of the bell-shaped drive housing. This is particularly important with an unlocked planetary gear set 23 as in that case the bell-shaped drive housing 25 and the torque converter housing 34 have different rotational speeds and thus considerable friction and eddy losses would occur with an oil-filled intermediate space 44 considering additionally the narrow wall spacings.

Since relative movements also occur within the housing part 25' with a non-locked or unlocked planetary gear set, yet this space cannot be kept completely free of oil by reason of the required lubrication of the planetary gear set 23, the oil quantity supplied continuously to the planetary gear set 23 by way of separate bores (not shown) is again automatically scooped off and discharged with an unlocked planetary gear set by means of a scooping tube 45. The carrier or support for the scooping tube 45 is formed by the step-shaped sleeve 29 which surrounds at the same time the one-way brake 46. The one-way brake 46 is operatively connected with the stationary housing part 41 by means of the inner ring thereof so as to be non-rotatable.

With a locked planetary gear set 23, i.e. the clutch $K_1$ or 31 engaged, the housing 25 together with the planetary gear set 23 and a scoop tube 45 rotates as a unit and is thus filled with oil because the scoop pipe 45 is thereby ineffectual. However, with an unlocked planetary gear set, i.e., the clutch $K_1$ or 31 disengaged, the scoop tube 45 together with the reaction member, that is, the sun gear 30, in contradistinction remains stationary and, in order to avoid friction and splash losses, automatically scoops the space accommodating the planetary gear set 23 and the friction disk clutch 31 free of oil to such an extent that only the lubricating circulatory system remains.

While we have shown and described one embodiment in accordance with the present invention, it is understood that the same is not limited thereto, but is susceptible of numerous changes and modificaions within the spirit and scope thereof, as known to a person skilled in the art, and we therefore do not wish to be limited to the details shown and described herein, but intend to cover all such changes and modifications as are encompassed by the scope of the appended claims.

We claim:

1. A change-speed transmission, especially for motor vehicles having a driving unit, comprising:

a hydrodynamic torque converter including an input side, an output side, pump means, turbine means and guide wheel means, planetary gear set means including input and output means, said planetary gear set means being operatively connected in the transmission ahead of the torque converter as seen in the normal direction of transmission of torque, and being located on the output side of the torque converter, bell-shaped housing means operatively connecting the input means of said planetary gear set with the driving unit and surrounding the torque converter, said pump wheel means including outer shell means forming a liquid-tight torque converter housing surrounding the turbine wheel means, said bell-shaped housing means being provided with a separate part forming a space for accommodating therein the planetary gear set means, and seal means for sealing the space in said separate housing part with respect to the interior of said torque converter housing as well as also with respect to the interior of the remainder of the bell-shaped housing means.

2. A change-speed transmission, especially for motor vehicles having a driving unit, comprising:
- a hydrodynamic torque converter including an input side, an output side, pump means, turbine means and guide wheel means,
- planetary gear set means including input and output means, said planetary gear set means being operatively connected in the transmission ahead of the torque converter as seen in the normal direction of transmission of torque, and being located on the output side of the torque converter,
- bell-shaped housing means operatively connecting the input means of said planetary gear set with the driving unit and surrounding the torque converter,
- said pump wheel means including outer shell means forming a liquid-tight torque converter housing surrounding the turbine wheel means,
- said bell-shaped housing means being provided with a separate part forming a space for accommodating therein the planetary gear set means,
- and seal means for sealing the space in said separate housing part with respect to the interior of said torque converter housing as well as also with respect to the interior of the remainder of the bell-shaped housing means,
- and means arranged within the space of said separate housing part of said bell-shaped housing means for discharging out of this housing part the quantities of lubricant which are supplied continuously for the lubrication of the planetary gear set means.

3. A change-speed transmission, especially for motor vehicles having a driving unit, comprising:
- a hydrodynamic torque converter including an input side, an output side, pump means, turbine means and guide wheel means,
- planetary gear set means including input and output means, said planetary gear set means being operatively conected in the transmission ahead of the torque converter as seen in the normal direction of transmission of torque, and being located on the output side of the torque converter,
- bell-shaped housing means operatively connecting the input means of said planetary gear set with the driving unit and surrounding the torque converter,
- said pump wheel means including outer shell means forming a liquid-tight torque converter housing surrounding the turbine wheel means,
- said bell-shaped housing means being provided with a separate part forming a space for accommodating therein the planetary gear set means,
- and seal means for sealing the space in said separate housing part with respect to the interior of said torque converter housing as well as also with respect to the interior of the remainder of the bell-shaped housing means,
- and means arranged within the space of said separate housing part of said bell-shaped housing means for discharging out of this housing part the quantities of lubricant which are supplied continuously for the lubrication of the planetary gear set means,
- selectively engageable means for shifting said planetary gear set means, and means operatively connecting said selectively engageable means with said discharge means in such a manner that during shifting of the planetary gear set means from the unlocked into the locked condition thereof, said discharge means is shifted automatically from an effective into an ineffective position thereof.

4. A change-speed transmission, especially for motor vehicles having a driving unit, comprising:
- a hydrodynamic torque converter including an input side, an output side, pump means, turbine means and guide wheel means,
- planetary gear set means including a reaction member and input and output means, said planetary gear set means being operatively connected in the transmission ahead of the torque converter as seen in the normal direction of transmission of torque, and being located on the output side of the torque converter,
- bell-shaped housing means operatively connecting the input means of said planetary gear set with the driving unit and surrounding the torque converter,
- said pump wheel means including outer shell means forming a liquid-tight torque converter housing surrounding the turbine wheel means,
- said bell-shaped housing means being provided with a separate part forming a space for accommodating therein the planetary gear set means,
- and seal means for sealing the space in said separate housing part with respect to the interior of said torque converter housing as well as also with respect to the interior of the remainder of the bell-shaped housing means,
- and means arranged within the space of said separate housing part of said bell-shaped housing means for discharging out of this housing part the quantities of lubricant which are supplied continuously for the lubrication of the planetary gear set means,
- selectively engageable means for shifting said planetary gear set means, and means operatively connecting said selectively engageable means with said discharge means in such a manner that during shifting of the planetary gear set means from the unlocked into the locked condition thereof, said discharge means is shifted automatically from an effective into an ineffective position thereof,
- said last-named means including a support member for said discharge means which is connected with the reaction member of the planetary gear set means for rotation in unison therewith.

5. In a change-speed transmission, especially for motor vehicles having a driving unit, which includes a hydrodynamic torque converter provided with pump means, turbine means and guide wheel means, input-connected planetary gear set operatively connected ahead of the torque converter and disposed on the output side of the torque converter, and a bell-shaped housing structure surrounding the torque converter and operatively connecting the input of the planetary gear set with the driving unit, and which the outer shell of said pump means forms a liquid-tight housing surrounding the turbine means,
- the improvement essentially consisting of a separate housing part in said bell-shaped housing structure for accommodating therein the planetary gear set, and seal means for sealing said separate housing part against the interior of said torque converter housing as well as against the inetrior of the remainder of the bell-shaped housing structure.

6. In a change-speed transmission, especially for motor vehicles having a driving unit, which includes a hydrodynamic torque converter provided with pump means, turbine means and guide wheel means, input-connected planetary gear set operatively connected ahead of the torque converter and disposed on the output side of the torque converter, and a bell-shaped housing structure surrounding the torque converter and operatively connecting the input of the planetary gear set with the driving unit, and which the outer shell of said pump means forms a liquid-tight housing surrounding the turbine means,
- the improvement essentially consisting of a separate housing part in said bell-shaped housing structure for accommodating therein the planetary gear set, and seal means for sealing said separate housing part against the interior of said torque converter housing as well as against the interior of the remainder of the bell-shaped housing structure, and means within the separate housing part of said bell-shaped housing structure for removing out of this housing part the oil quantities which are supplied for the lubrication of the planetary gear set.

7. In a change-speed transmission, especially for motor vehicles having a driving unit, which includes a hydrodynamic torque converter provided with pump means, turbine means and guide wheel means, input-connected shiftable planetary gear set operatively connected ahead of the torque converter and disposed on the output side of the torque converter, and a bell-shaped housing structure surrounding the torque converter and operatively connecting the input of the planetary gear set with the driving unit, and which the outer shell of said pump means forms a liquid-tight housing surrounding the turbine means, the improvement essentially consisting of a separate housing part in said bell-shaped housing structure for accommodating therein the planetary gear set, and seal means for sealing said separate housing part against the interior of said torque converter housing as well as against the interior of the remainder of the bell-shaped housing structure, and means within the separate housing part of said bell-shaped housing structure for removing out of this housing part the oil quantities which are supplied for the lubrication of the planetary gear set including means for automatically shifting said last-mentioned means from an effective into an ineffective condition, when shifting the planetary gear set from the unlocked into the locked condition thereof.

8. A change-speed transmission, especially for motor vehicles having a driving unit, comprising:

a hydrodynamic torque converter including an input side, an output side, pump means, turbine means and guide wheel means, shiftable planetary gear set means including input and output means, said planetary gear set means being operatively connected in the transmission ahead of the torque converter as seen in the normal direction of transmission of torque, and being located on the output side of the torque converter, bell-shaped housing means operatively connecting the input means of said planetary gear set with the driving unit and surrounding the torque converter, the output means of said planetary gear set being operatively connected with said pump wheel means, said pump wheel means including outer shell means forming a liquid-tight torque converter housing surrounding the turbine wheel means, said bell-shaped housing means being provided with a separate part forming a space for accommodating therein the planetary gear set means, and seal means for sealing the space in said separate housing part with respect to the interior of said torque converter housing as well as also with respect to the interior of the remainder of the bell-shaped housing means.

9. A change-speed transmission, especially for motor vehicles having a driving unit, comprising:

a hydrodynamic torque converter including an input side, an output side, pump means, turbine means and guide wheel means, shiftable planetary gear set means including input and output means, said planetary gear set means being operatively connected in the transmission ahead of the torque converter as seen in the normal direction of transmission of torque, and being located on the output side of the torque converter, bell-shaped housing means operatively connecting the input means of said planetary gear set with the driving unit and surrounding the torque converter, the output means of said planetary gear set being operatively connected with said pump wheel means, said pump wheel means including outer shell means forming a liquid-tight torque converter housing surrounding the turbine wheel means, said bell-shaped housing means being provided with a separate part forming a space for accommodating therein the planetary gear set means, and seal means for sealing the space in said separate housing part with respect to the interior of said torque converter housing as well as also with respect to the interior of the remainder of the bell-shaped housing means, means continuously supplying a lubricant to said space, and means including at least one scooping member arranged within the space of said separate housing part of said bell-shaped housing means for discharging out of this housing part the quantities of lubricant which are supplied continuously for the lubrication of the planetary gear set means.

10. A change-speed transmission, especially for motor vehicles having a driving unit, comprising:

a hydrodynamic torque converter including an input side, an output side, pump means, turbine means and guide wheel means, shiftable planetary gear set means including input and output means, said planetary gear set means being operatively connected in the transmission ahead of the torque converter as seen in the normal direction of transmission of torque, and being located on the output side of the torque converter, bell-shaped housing means operatively connecting the input means of said planetary gear set with the driving unit and surrounding the torque converter, the output means of said planetary gear set being operatively connected with said pump wheel means, said pump wheel means including outer shell means forming a liquid-tight torque converter housing surrounding the turbine wheel means, said bell-shaped housing means being provided with a separate part forming a space for accommodating therein the planetary gear set means, and seal means for sealing the space in said separate housing part with respect to the interior of said torque converter housing as well as also with respect to the interior of the remainder of the bell-shaped housing means, means continuously supplying a lubricant to said space, and means including at least one scooping member arranged within the space of said separate housing part of said bell-shaped housing means for discharging out of this housing part the quantities of lubricant which are supplied continuously for the lubrication of the planetary gear set means, selectively engageable means for shifting said planetary gear set means, and means operatively connecting said selectively engageable means with said discharge means in such a manner that during shifting of the planetary gear set means from the unlocked into the locked condition thereof, said discharge means is shifted automatically from an effective into an ineffective position thereof.

References Cited by the Examiner

UNITED STATES PATENTS

| | | | |
|---|---|---|---|
| 1,766,686 | 6/1930 | Redmond | 184—62 |
| 2,349,642 | 5/1944 | Watson | 74—688 |
| 2,414,359 | 1/1947 | Carnagua et al. | 74—763 |
| 2,899,844 | 8/1959 | Hattan | 74—688 |
| 3,023,636 | 3/1962 | Kelley et al. | 74—688 |
| 3,074,688 | 1/1963 | De Muth et al. | 184—61 |

DAVID J. WILLIAMOWSKY, *Primary Examiner.*

THOMAS C. PERRY, *Examiner.*